US012712697B2

(12) United States Patent
Panteleev et al.

(10) Patent No.: US 12,712,697 B2
(45) Date of Patent: Aug. 18, 2026

(54) CHANNEL STATE INFORMATION (CSI) REPORTING FOR EXTENDED (SIGNAL TO INTERFERENCE AND NOISE RATIO) SINR RANGE FOR ULTRA RELIABLE AND LOW LATENCY COMMUNICATION (URLLC)

(71) Applicant: Intel Corporation, Santa Clara, CA (US)

(72) Inventors: Sergey Panteleev, Kildare (IE); Debdeep Chatterjee, San Jose, CA (US); Fatemeh Hamidi-Sepehr, San Jose, CA (US); Salvatore Talarico, Santa Clara, CA (US); Toufiqul Islam, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 18/558,160

(22) PCT Filed: Aug. 2, 2022

(86) PCT No.: PCT/US2022/039131

§ 371 (c)(1),
(2) Date: Oct. 30, 2023

(87) PCT Pub. No.: WO2023/014689

PCT Pub. Date: Feb. 9, 2023

(65) Prior Publication Data

US 2024/0223341 A1 Jul. 4, 2024

Related U.S. Application Data

(60) Provisional application No. 63/251,524, filed on Oct. 1, 2021, provisional application No. 63/230,274, filed on Aug. 6, 2021.

(51) Int. Cl.
*H04L 5/00* (2006.01)
*H04W 72/541* (2023.01)

(52) U.S. Cl.
CPC .......... *H04L 5/0057* (2013.01); *H04L 5/0094* (2013.01); *H04W 72/541* (2023.01)

(58) Field of Classification Search
CPC ... H04L 5/0094; H04L 5/0057; H04W 72/541
See application file for complete search history.

(56) References Cited

U.S. PATENT DOCUMENTS

2016/0337105 A1* 11/2016 Lawton ................. H04L 5/0057
2021/0385818 A1* 12/2021 Levitsky ............. H04W 72/569
2023/0283342 A1* 9/2023 Ahmed Salem ....... H04B 7/066
370/329

FOREIGN PATENT DOCUMENTS

| | | | |
|---|---|---|---|
| EP | 3625924 | B1 | 5/2021 |
| JP | 2009049540 | A | 3/2009 |
| JP | 2018509803 | A | 4/2018 |

OTHER PUBLICATIONS

International Patent Office—International Search Report and Written Opinion mailed Nov. 22, 2022 from International Patent Application No. PCT/US2022/039131, 9 pages.

(Continued)

*Primary Examiner* — Kent Krueger
(74) *Attorney, Agent, or Firm* — Gray Ice Higdon, PLLC

(57) ABSTRACT

Various embodiments herein provide techniques related to CWI for a wideband and one or more sub-bands of the wideband. In embodiments, a user equipment (UE) transmit a wideband channel quality index (CQI) report related to the channel state information (CSI) of the wideband. The UE may further identify, from the set of 2, 3, 4, and 5, a number of bits to use for a sub-band CQI report related to a sub-band of the one or more sub-bands, and transmit a sub-band CQI (Continued)

report based on the identified number of bits. Other embodiments may be described and/or claimed.

20 Claims, 6 Drawing Sheets

(56) References Cited

OTHER PUBLICATIONS

Huawei, et al., "CSI feedback enhancements," 3GPP TSG RAN WG1 #105-e , R1-2104263, Agenda Item: 8.3.1.2, May 10-27, 2021, e-Meeting, 20 pages.
Mediatek Inc., "CSI feedback enhancements for URLLC," 3GPP TSG RAN WG1 Meeting #105-e, R1-2105733, Agenda Item: 8.3.1.2, May 10-27, 2021, e-Meeting, 8 pages.
NTT Docomo, Inc., "Discussion on CSI feedback enhancements for Rel.17 URLLC," 3GPP TSG RAN WG1 #105-e, R1-2105694, Agenda Item: 8.3.1.2, May 10-27, 2021, e-Meeting, 6 pages.
Samsung, "CSI Report Enhancements for URLLC," 3GPP TSG RAN WG1 #105, R1-2105303, Agenda item: 8.3.1.2, May 19-27, 2021, e-Meeting, 5 pages.
3GPP, "Technical Specification Group Radio Access Network; NR; Physical layer procedures for data (Release 16)," 3GPP TS 38.214 V16.6.0 (Jun. 2021), 5G, 172 pages.
Japanese Patent Office; Examination Report issued on Nov. 5, 2024 for Patent Application No. 2023-566712, 13 pages.
Huawei, Hisilicon, "CSI feedback enhancements," 3GPP TSG RAN WG1 #105--e, e-Meeting, May 10-27, 2021, R1-2104263, Agenda Item 8.3.1.2, 22 pages.
Intel Corporation, "On enhanced SB CQI reporting granularity and delta-MCS reporting," 3GPP TSG RAN WG1 #106-e, e-Meeting, Aug. 16-27, 2021, R1-2107584, Agenda Item: 8.3.1.2, 7 pages.

* cited by examiner

UE 402
Uu
RAN 404
AN 408
AP 406
LTE RAN 410
eNB 412
CN 420
Application/ Content Server 438
DN 436
LTE CN 422
To RAN
S1-MME
MME 424
S3
SGSN 428
S6a
HSS 430
S11
To RAN
S1-U
SGW 426
S5
PGW 432
Gx
PCRF 434
Gx
To DN
SGI
To DN
NG-RAN 44
gNB 416
NG
Xn
ng-eNB 418
NG
400
5GC 440
AUSF 442
N13
Nausf
N12
To UE
N1
To RAN
N2
AMF 444
Namf
N8
N15
N22
N11
SMF 446
Nsmf
N7
N10
N4
N3
UPF 448
N6 To DN
N22
Nnssf
NSSF – 450
Nnef
NEF – 452
Nnrf
NRF – 454
N15
N7
Npcf
PCF – 456
N5
N8
N10
N13
Nudm
UDM – 458
Nnaf
AF – 460

CHANNEL STATE INFORMATION (CSI) REPORTING FOR EXTENDED (SIGNAL TO INTERFERENCE AND NOISE RATIO) SINR RANGE FOR ULTRA RELIABLE AND LOW LATENCY COMMUNICATION (URLLC)

CROSS REFERENCE TO RELATED APPLICATION

The present application is a national phase entry under 35 U.S.C. § 371 of International Application No. PCT/US2022/039131, filed Aug. 2, 2022, entitled "CHANNEL STATE INFORMATION (CSI) REPORTING FOR EXTENDED (SIGNAL TO INTERFERENCE AND NOISE RATIO) SINR RANGE FOR ULTRA RELIABLE AND LOW LATENCY COMMUNICATION (URLLC)," which claims priority to U.S. Provisional Patent Application No. 63/230,274, which was filed Aug. 6, 2021; and to U.S. Provisional Patent Application No. 63/251,524, which was filed Oct. 1, 2021, the entire disclosures of which are hereby incorporated by reference.

FIELD

Various embodiments generally may relate to the field of wireless communications. For example, some embodiments may relate to channel state information (CSI) reporting.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
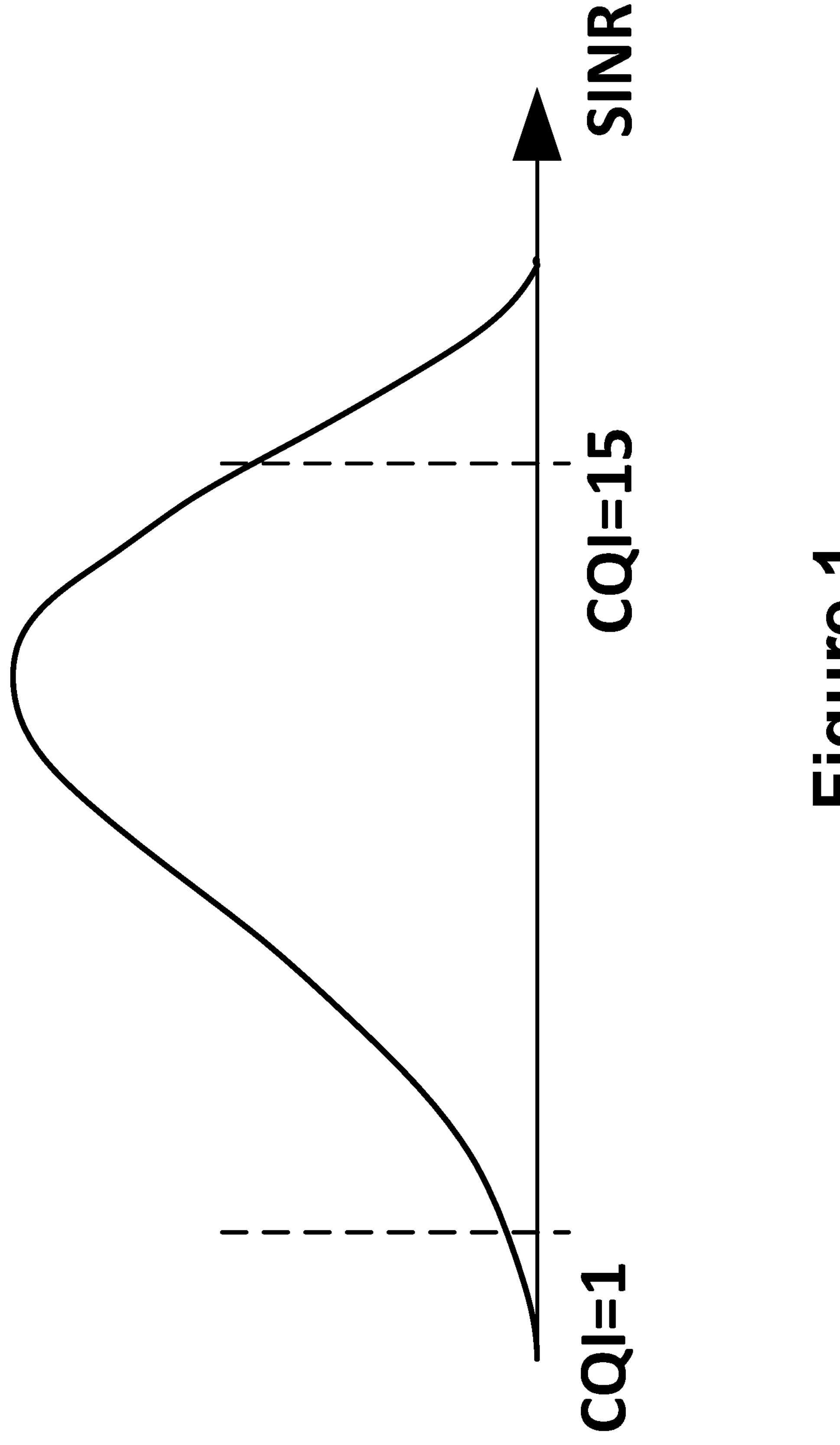
FIG. 1 depicts an example of an effective signal to interference and noise ratio (SINR) range distribution covered by a channel quality indicator (CQI) table, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Release 17 (Rel-17) of the third generation partnership project (3GPP) specifications may include or relate to enhancements to fifth generation (5G)/new radio (NR) technology to better support ultra-reliable low-latency communication (URLLC) in industrial internet of things scenarios (IIOT). This support for URLLC/IIOT may be related to enhancing channel state information (CSI) feedback for more accurate modulation and coding scheme (MCS) selection in the target scenarios. In some cases, link adaptation for URLLC use cases may have their own specific considerations such as:

- In many scenarios, the URLLC data transmissions may be relatively small and transmitted using a single transport block. This creates a large variation in terms of interference statistics when a given transmission point changes allocation parameters and presence of data frequently, because in every time occasion, a new user could require anew transmission.
- This situation is different from legacy enhanced mobile broadband (eMBB) scenarios where the packets for transmission may be relatively large and need to be transmitted using multiple transport blocks and therefore slots. In legacy eMBB scenarios, the channel state measured in the beginning of the downlink (DL) session may be applied for upcoming transport blocks with possible outer-loop adjustment based on hybrid automatic repeat request (HARQ) acknowledgements.
- For the URLLC/IIOT scenarios with bursty interference, the legacy link adaptation may not work well for one or more of the following reasons:
  - There may not be adequate time to measure the channel after the packet is triggered;
  - The measurement performed in one slot may not be accurate if applied to another slot; and/or
  - There may be no chance to apply the outer-loop link adaptation mechanism, since a negative acknowledgement may contribute to the latency.

In these conditions, the knowledge of the channel information may need to be as accurate as possible so that a 5G base station (which may be referred to as a "gNB") may analyze separate CSI reports on different bands and slots and potentially re-predict the signal quality distribution in time and frequency domain. This may help a gNB to know the probability of having SINR less than a given target (which is referred to herein as "SINR target" and which may be, for example, predefined), or greater than SINR target, for a given target packet error rate.

In some cases, it may be desirable to enhance sub-band CQI reporting signaling granularity from 2 bits to 3-4 bits, assuming it may provide more information about SINR in each sub-band compared to the wideband CQI report. However, this may not help much the gNB to understand/estimate the tails of the SINR distribution which are important to predict the worst-case performance.

Under these assumptions, enhancements to the CSI framework may be considered. In some embodiments, the above-described issues associated with the link adaptation and CSI framework in URLLC may be resolved, removed, or mitigated by one or more of the following:

Enhanced sub-band CQI signaling for extended range CQI reporting

Multiple CQI table usage for extended range CQI reporting

Legacy 3GPP specifications related to NR may support CQI reporting using 4-bit wideband CQI. See, for example, tables 5.2.2.1-2 [regular 64 quadrature amplitude modulation (QAM) table], 5.2.2.1-3 [256 QAM table], and 5.2.2.1-4 [low spectral efficiency (SE) 64 QAM table] from the 3GPP technical specification (TS) 38.214. These example tables may relate to different ranges of SINR/SE, and are copied below for reference. Legacy 3GPP specifications may further support and differential sub-band CQI reporting using 2 bits indication, which are interpreted with respect to the wideband CQI value signaled using 4 bits. This is further illustrated in Table 5.2.2.1-1 in 3GPP TS 38.214, which is copied below for reference.

TABLE 5.2.2.1-2

4-bit CQI Table

| CQI index | modulation | code rate × 1024 | efficiency |
|---|---|---|---|
| 0 | | out of range | |
| 1 | Quadrature phase shift keying (QPSK) | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 5.2.2.1-3

4-bit CQI Table 2

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 5.2.2.1-4

4-bit CQI Table 3

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

TABLE 5.2.2.1-1 from TS 38.214: Mapping sub-band differential CQI value to offset level

| Sub-band differential CQI value | Offset level |
|---|---|
| 0 | 0 |
| 1 | 1 |
| 2 | ≥2 |
| 3 | ≤−1 |

As may be secn in one or more of the tables above, and particularly Table 5.2.2.1-1 from TS 38.214, the sub-band information may be clipped at levels −1 and +2 from the wideband CQI. For URLLC use cases, such a clipping, especially in the negative domain, may be quite detrimental because the information about a strong interference or channel fade in a given sub-band is inaccurate. Furthermore, if a UE has a good quality in some sub-bands, the information may also be lost beyond 2 levels above.

To avoid the loss of the sub-band channel quality information, 3- or 4-bit sub-band CQI signaling may be used, and therefore provide either 8 or 16 levels of sub-band CQI with respect to or regardless of wideband (WB) CQI.

However, in some cases the extension of the signaling may not provide desirable system performance because the tails of the SINR distribution, e.g., very low or very high SINRs may be poorly represented by the signaling limited to legacy CQI tables, as illustrated in FIG. 1. For example, as secn in FIG. 1, there may be a portion of the SINR distribution above (e.g., to the right of) CQI=15 or below (e.g., to the left of) CQI=1 that is difficult to represent with legacy 2 to 4-bit CQI tables. As a result, the "clipping" effect described previously may occur.

In the next sections, techniques to extend the range of effective SINR reported by CQI are presented, which may solve the issue of inaccurate effective SINR distribution prediction at a gNB scheduler. Specifically, embodiments herein may expand the legacy CQI tables through a variety of options described below.

Extended Range CQI Reporting

In one example embodiment, a UE may be configured with an alternative sub-band CQI signaling mechanism wherein the sub-band CQI is signaled by an X-bit payload, with X being a value from 2,3,4, or 5. In some embodiments, the value of X may be signaled to the UE by a base station. Specifically, the base station may provide a value of X via dedicated Radio Resource Control (RRC) signalling and the actual sub-band CQI may be calculated from a wideband CQI and the X-bit payload using one or the combination of the following novel procedures:

- Example Technique 1: The X-bit sub-band CQI may be interpreted as an offset from the reported wideband CQI, with at least one or two codepoints of the X-bit range denoting one or both of: very low SINR (outage SINR) and very high SINR
  - Here, the "very high SINR" can be interpreted as the channel quality that may correspond to a spectral efficiency value (SE) greater than SE of the CQI=15 by at least Y bit/sec/Hz, where Y may be for example 0.5, 1, 1.5 or any other positive value. Y may be pre-defined in specification or may be configurable by the network to the UE as part of CSI measurement and reporting framework.
  - Here, the "very low SINR" can be interpreted as the channel quality that may correspond to a SE value smaller than SE of CQI=1 by at least Z bit/sec/Hz, where Z may be for example 0.5, 1, 1.5 or any other positive value. Z may be pre-defined in specification or may be configurable by the network to the UE as part of CSI measurement and reporting framework.
- Example Technique 2: The "out of range" CQI value=0 may be associated with a more precise meaning of the "out of range". The UE may be configured to interpret CQI=0 to be associated with at least Z bit/sec/Hz smaller SE value than the CQI value=1 in the configured table.
- Example Technique 3: For X-bit differential sub-band CQI reporting, the UE may be configured how to use the 2^X levels of the differential signaling with respect to WB CQI, e.g., where in the scale to place the WB_CQI. For example, a UE may be configured/instructed to always report an X-bit difference to WB CQI with A levels above the WB CQI and (2^X−A) levels equal to or below the WB CQI and may apply special handling when |WB CQI+SB diff CQI| is <1 or >15, e.g., how to handle the resulting value over the legacy range of 0 . . . 15. The value of A may either be predefined for example to 2^(X−1) or to 2^(X−1)-1; or may be calculated based on the actual WB CQI value, e.g. A=min(15-WB_CQI, 2^X), meaning that the differential CQI could not report the value larger than 15 in this case, or smaller than 0. Alternative calculation for A may be considered as follows:
  - $A = \min(16 - \text{WB\_CQI}, 2^{\wedge}X)$
  - $A = \min(15 - \text{WB\_CQI}, 2^{\wedge}(X-1))$ -continued

- $A = \min(16 - \text{WB\_CQI}, 2^{\wedge}(X-1))$
  - *Etc.*

When |WB_CQI−SB_CQI_difference| exceeds the range 0 . . . 15, a specific handling may be applied. For example, it may be defined that every step down or up from the bound of the effective SINR range defined by CQI=1 and CQI=15 may be interpreted as B dB offset from the SINR corresponding to CQI=1 or CQI=15, wherein the B dB offset may be pre-defined in specification (e.g. to 1,1.5, 2, 2.5, 3 dB etc.) or may be configurable as part of CSI reporting and measurements configuration.

Alternatively, a UE may be configured/instructed to append additional CQI table values to the one associated with current CSI reporting and measurements configuration. For example, when a UE is configured with lowSE64QAM table (defined in Table 5.2.2.1-4), it may append higher values from regular 64QAM table (defined in Table 5.2.2.1-2) or 256QAM table (defined in Table 5.2.2.1-3) by taking entries 14 and 15 from 64QAM table or entries 11, 12, 13, 14, 15 from the 256QAM table.

- Example Technique 4: There may be special combinations of WB_CQI and SB_CQI introduced that provide additional information. For example, when 4-bit SB CQI reporting is employed, then the meaning of WB_CQI may be changed, since the regular WB_CQI can be derived directly from separate SB_CQIs. For example, the WB_CQI may be interpreted as an offset (in terms of SE or SINR) to SB_CQI reports, that can provide additional information beyond the SINR range of a single CQI table.
- Example Technique 5: In an embodiment, assuming that sub-band CQI is reported for all sub-bands, a UE may be indicated to use extended bit-field of X=3 or 4 bits for reporting of differential sub-band CQI for the worst-M sub-bands or for the best-N sub-bands or for both, where the values of M and N may be specified (e.g., as a fixed value or as a function of the total number of sub-bands) or configured to the UE via dedicated higher layer signaling. Such an approach can enable a better trade-off between the higher range of sub-band CQI reporting and the incurred UL overhead (OH) in terms of increased UL control information (UCI) as against the option of using extended bit-fields for sub-band CQI reporting for all sub-bands since it can be expected that in many scenarios, for a significant number of sub-bands, reporting the sub-band CQI with respect to WB_CQI using the 2-bit offset as per Rel-15 NR specifications may be sufficient.
- Example Technique 6: In one embodiment, when all sub-bands are configured with 4-bit CQI reporting, the WB CQI may be re-interpreted so that SB CQI is calculated as the 4-bit SB CQI value plus CQI offset signaled in WB CQI taking range from [−8 . . . +7], or other range [X . . . X+15], where X may be configured or predefined from −15 to 15.
  - When resulting SB CQI is <1 or >15, the corresponding SE is scaled. For example, for CQI=0, the SE may be derived from CQI=1 by scaling 2 times, or assuming 2 repetitions of the same TB associated with CQI=1. For CQI=−1, the scaling may be 3 times, or assuming 3 repetitions of the same TB, and so on. Moreover, the modulation, SE, code rate and number of repetitions corresponding to a given CQI value<1 and >15 may be configured by RRC.

Example Technique 7: In one embodiment, when all sub-bands are configured with 4-bit CQI reporting, the WB CQI may be re-interpreted as the minimum effective SINR among indicated sub-bands including values below the SINR corresponding to CQI=1. A mapping table between effective SINR/SE for CQI<1 and the value signaled in WB CQI may be configured by RRC or predefined in specification.

Multiple CQI Tables Reporting

Similar to the mechanisms discussed in the previous sub-section, it may be possible to extend the value range for the reported effective SINR by configuring/enabling a UE to report WB_CQI and SB_CQI based on multiple CQI tables. As may be seen in the CQI that were previously discussed, different tables cover different ranges of SINR/SE: regular 64 QAM table covers SE from 0.1523 to 5.5547, 256 QAM tables covers SE from 0.1523 to 7.4063, and lowSE64QAM table cover SE from 0.0586 to 4.5234.

If the ranges of different tables are combined, e.g. lowSE64QAM+64QAM or lowSE64QAM+256QAM then it covers larger distribution of effective SINR of the channel: 0.0586 to 7.4063 in the latter case.

In one example, a UE may be configured/instructed to report WB_CQI using a first CQI table and first BLER target, and SB_CQI with X-bit differential or absolute signaling using a second CQI table BLER target. The first and the second BLER target may be separately configurable from the CQI table.

In one example, a UE may be configured/instructed to report WB_CQI and SB_CQI for a first table for a first BLER target, and WB_CQI and X-bit differential or absolute SB_CQI for a second table for a second BLER target.

In one example, a UE may be configured/instructed to report absolute SB_CQIs for a first table for a first BLER target, and a WB_CQI which is interpreted as an offset to SINR or SE associated with the SB_CQIs of the first table to obtain SB_CQIs associated with the second table for a second BLER target. In particular, SB_CQI_1=SB_CQI_0+F(WB_CQI), where FO is a function of conversion of the WB_CQI value to an offset for obtaining SB_CQI_1 of another table from the first table SB_CQI_0.

In one example, a UE may be configured with multiple CQI tables and a single BLER target per CSI report configuration, and the table the CQI is signaled for, may be selected by UE implementation and indicated in the CSI report together with the CQI values. In particular, one bit may be used to indicate one of the two tables. This may be done either by a separate field in CSI report, or by using e.g. MSB or LSB of the WB CQI or SB CQI, e.g. for 4-bit SB-CQI, 1 bit is used for table reporting, and 3 bits are used for SB-CQI.

EXAMPLE TECHNIQUES

Figure 2:
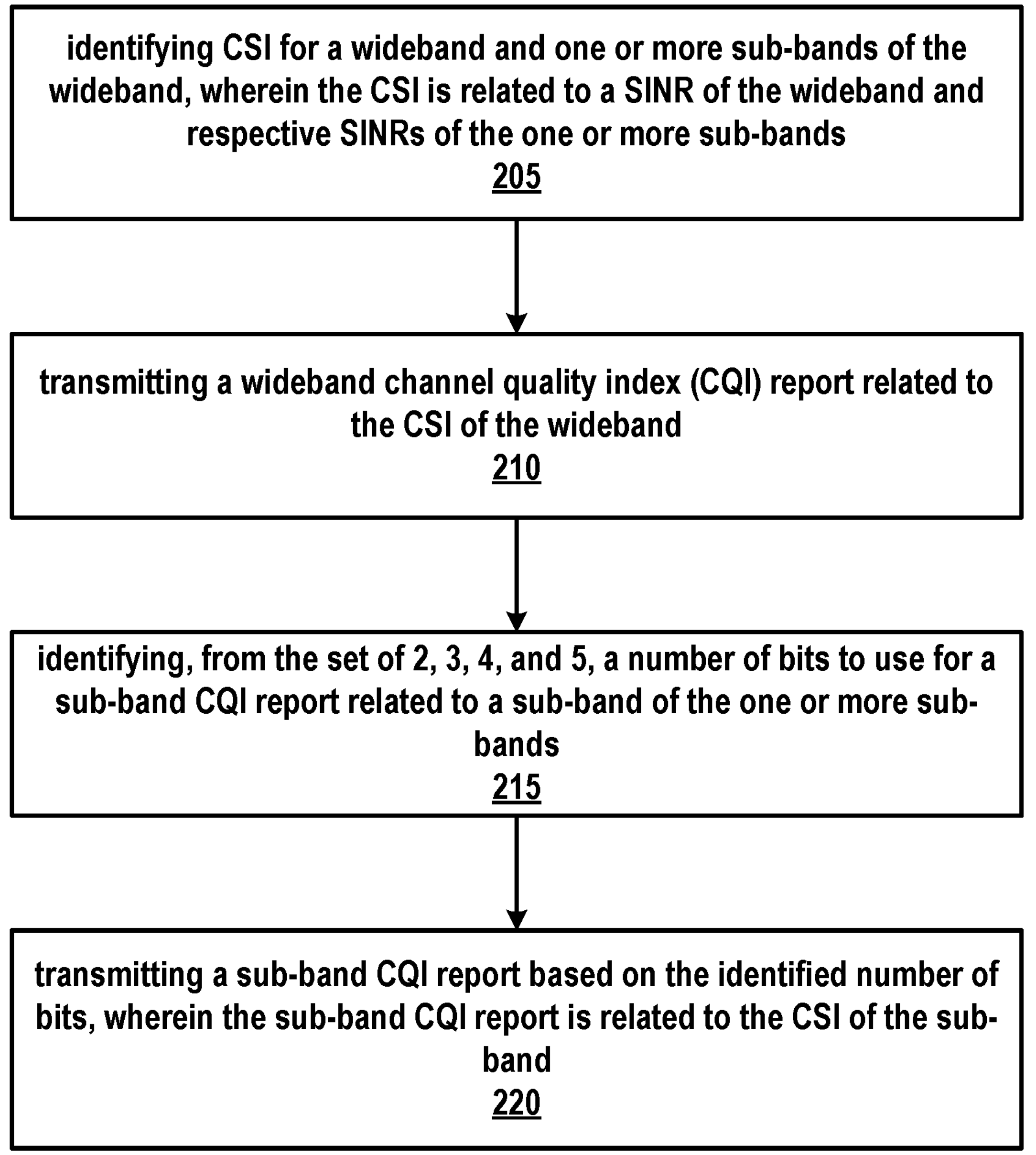
FIG. 2 depicts an example technique to be performed by a user equipment (UE), in accordance with various embodiments.

FIG. 2 depicts an example technique to be performed by a user equipment (UE), in accordance with various embodiments. In some embodiments, the technique of FIG. 2 may be performed by a UE, one or more elements of a UE, and/or one or more electrical devices that include or implement one or more elements of a UE. The technique may include identifying, at 205, CSI for a wideband and one or more sub-bands of the wideband. As noted above, the CSI may be related to an SINR or SINR measurement of the wideband. The CSI may further be related to respective SINRs or SINR measurements of the one or more sub-bands.

The technique may further include transmitting, at 210 to a base station, a wideband CQI report that is related to the CSI of the wideband.

The technique may further include identifying, at 215 from the set of 2, 3, 4, and 5, a number of bits to use for a sub-band CQI report related to a sub-band of the one or more sub-bands. More particularly, the identification at 215 may be of a 2-bit CQI table, a 3-bit CQI table, a 4-bit CQI table, or a 5-bit CQI table that is to be used for the sub-band CQI report, as described above.

The technique may further include transmitting, at 220, a sub-band CQI report based on the number of bits identified at 215. For example, a sub-band CQI report may be transmitted based on a 2-bit CQI table, a 3-bit CQI table, a 4-bit CQI table, or a 5-bit CQI table. The CQI report may be related to the CSI of the sub-band.

Figure 3:
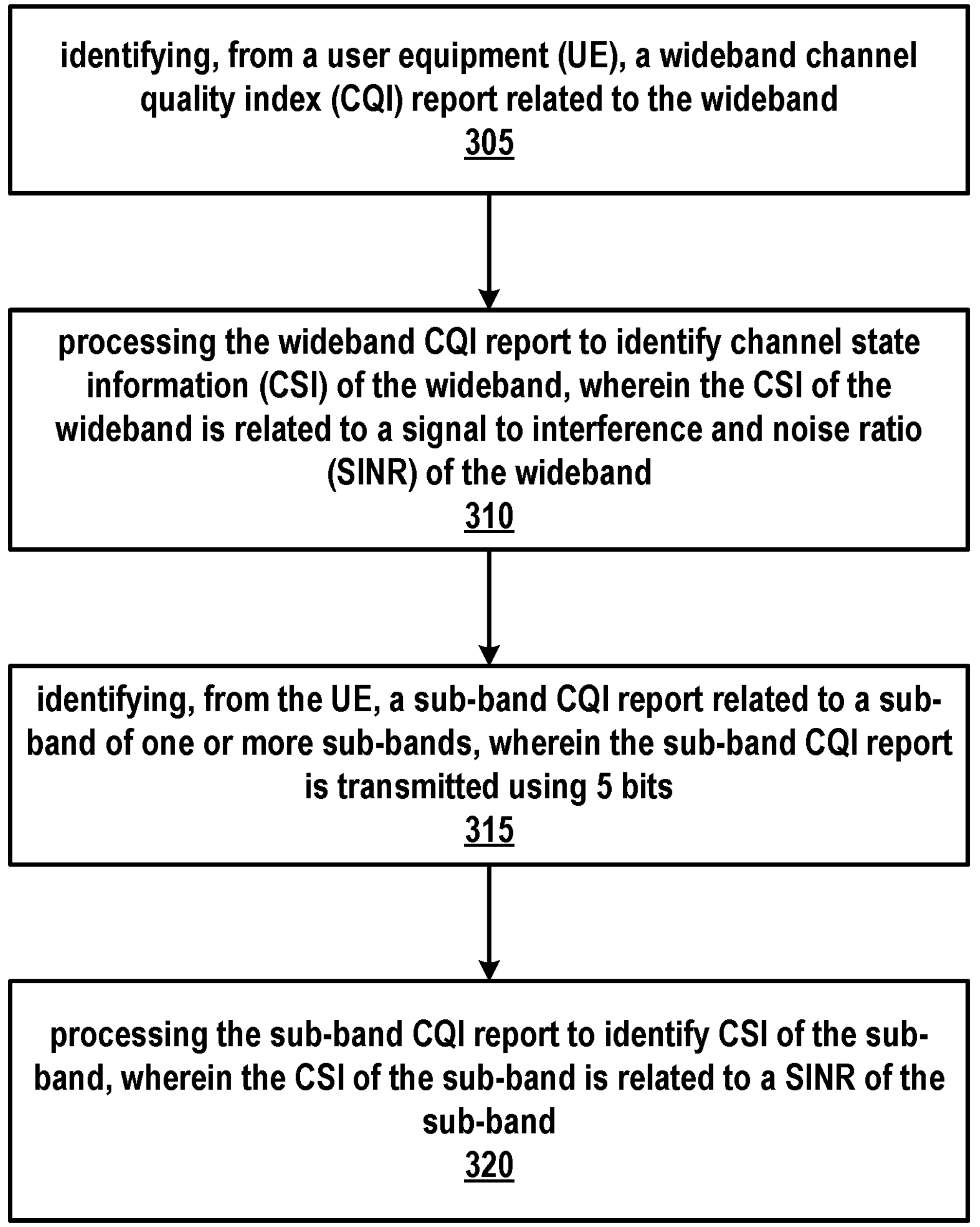
FIG. 3 depicts an alternative example technique to be performed by a base station, in accordance with various embodiments.

FIG. 3 depicts an alternative example technique to be performed by a base station, in accordance with various embodiments. In some embodiments, the technique of FIG. 3 may be performed by a base station, one or more elements of a base station, and/or one or more electrical devices that include or implement one or more elements of a base station. The technique may include identifying, at 305 from a UE (e.g., in a transmission received from a UE), a wideband CQI report related to the wideband. The technique may further include processing, at 310, the wideband CQI to report CSI of the wideband. As previously noted, the CWI of the wideband may be related to an SINR and/or an SINR measurement of the wideband.

The technique may further include identifying, at 315 from the UE (e.g., in a transmission received from the UE), a sub-band CQi report related to a sub-band of one or more sub-bands. The sub-band CQI report may be transmitted using 5 bits. For example, in some embodiments, the sub-band CQI report may be transmitted based on a 5-bit CQI table. In other embodiments, the sub-band CQI report may be transmitted using 2-4 bits.

The technique may further include processing, at 320, the sub-band CQI report to identify CSI of the sub-band. As previously noted, the CWI of the sub-band may be related to an SINR and/or an SINR measurement of the sub-band.

It will be noted that the above-described technique are intended as example techniques of specific embodiments, and other embodiments may include more or fewer elements, elements arranged in a different order, elements occurring concurrently with one another, etc.

SYSTEMS AND IMPLEMENTATIONS

Figure 4:
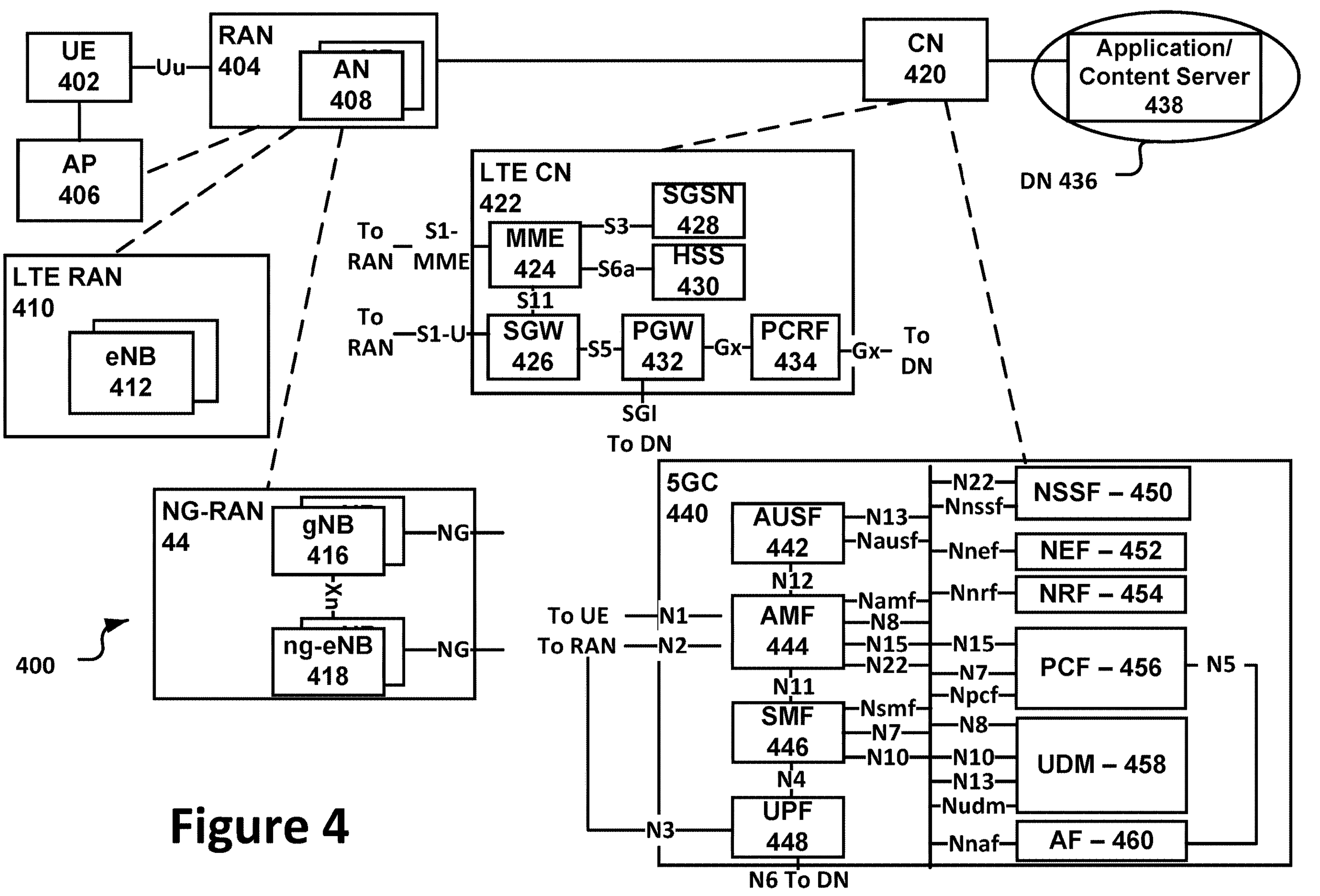
FIG. 4 schematically illustrates a wireless network in accordance with various embodiments.
Figure 5:
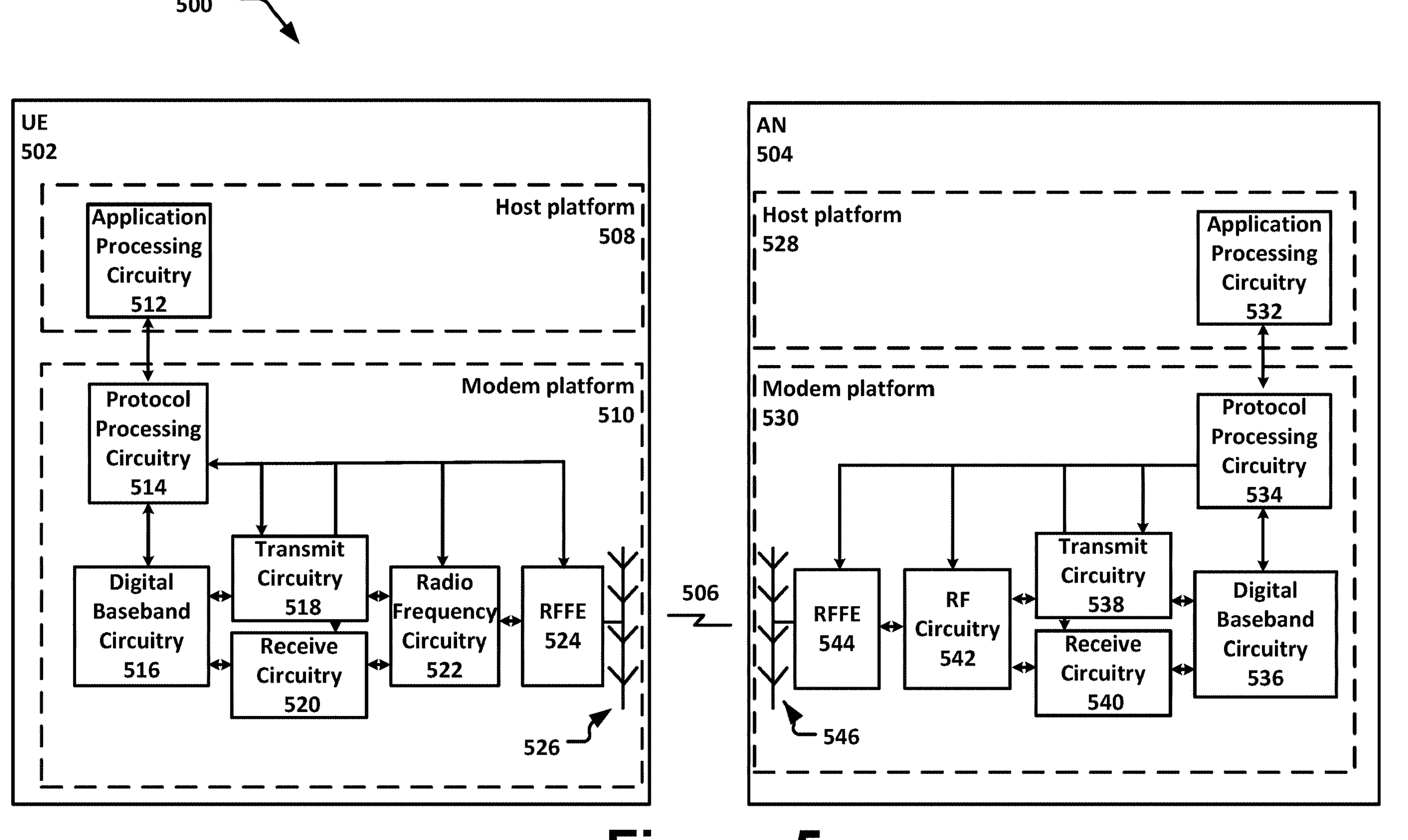
FIG. 5 schematically illustrates components of a wireless network in accordance with various embodiments.

FIGS. 4-5 illustrate various systems, devices, and components that may implement aspects of disclosed embodiments.

FIG. 4 illustrates a network 400 in accordance with various embodiments. The network 400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 400 may include a UE 402, which may include any mobile or non-mobile computing device designed to communicate with a RAN 404 via an over-the-air connection. The UE 402 may be communicatively coupled with the RAN 404 by a Uu interface. The UE 402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 402 may additionally communicate with an AP 406 via an over-the-air connection. The AP 406 may manage a WLAN connection, which may serve to offload some/all network traffic from the RAN 404. The connection between the UE 402 and the AP 406 may be consistent with any IEEE 802.11 protocol, wherein the AP 406 could be a wireless fidelity (Wi-Fi®) router. In some embodiments, the UE 402, RAN 404, and AP 406 may utilize cellular-WLAN aggregation (for example, LWA/LWIP). Cellular-WLAN aggregation may involve the UE 402 being configured by the RAN404 to utilize both cellular radio resources and WLAN resources.

The RAN 404 may include one or more access nodes, for example, AN 408. AN 408 may terminate air-interface protocols for the UE 402 by providing access stratum protocols including RRC, PDCP, RLC, MAC, and L1 protocols. In this manner, the AN 408 may enable data/voice connectivity between CN 420 and the UE 402. In some embodiments, the AN 408 may be implemented in a discrete device or as one or more software entities running on server computers as part of, for example, a virtual network, which may be referred to as a CRAN or virtual baseband unit pool. The AN 408 be referred to as a BS, gNB, RAN node, eNB, ng-eNB, NodeB, RSU, TRxP, TRP, etc. The AN 408 may be a macrocell base station or a low power base station for providing femtocells, picocells or other like cells having smaller coverage areas, smaller user capacity, or higher bandwidth compared to macrocells.

In embodiments in which the RAN 404 includes a plurality of ANs, they may be coupled with one another via an X2 interface (if the RAN 404 is an LTE RAN) or an Xn interface (if the RAN 404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 404 may each manage one or more cells, cell groups, component carriers, etc. to provide the UE 402 with an air interface for network access. The UE 402 may be simultaneously connected with a plurality of cells provided by the same or different ANs of the RAN 404. For example, the UE 402 and RAN 404 may use carrier aggregation to allow the UE 402 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 402 or AN 408 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 404 may be an LTE RAN 410 with eNBs, for example, eNB 412. The LTE RAN 410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 404 may be an NG-RAN 414 with gNBs, for example, gNB 416, or ng-eNBs, for example, ng-eNB 418. The gNB 416 may connect with 5G-enabled UEs using a 5G NR interface. The gNB 416 may connect with a 5G core through an NG interface, which may include an N2 interface or an N3 interface. The ng-eNB 418 may also connect with the 5G core through an NG interface, but may connect with a UE via an LTE air interface. The gNB 416 and the ng-eNB 418 may connect with each other over an Xn interface.

In some embodiments, the NG interface may be split into two parts, an NG user plane (NG-U) interface, which carries traffic data between the nodes of the NG-RAN 414 and a UPF 448 (e.g., N3 interface), and an NG control plane (NG-C) interface, which is a signaling interface between the nodes of the NG-RAN414 and an AMF 444 (e.g., N2 interface).

The NG-RAN 414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 402 can be configured with multiple BWPs where each BWP configuration has a different SCS. When a BWP change is indicated to the UE 402, the SCS of the transmission is changed as well. Another use case example of BWP is related to power saving. In particular, multiple BWPs can be configured for the UE 402 with different amount of frequency resources (for example, PRBs) to support data transmission under different traffic loading scenarios. A BWP containing a smaller number of PRBs can be used for data transmission with small traffic load while allowing power saving at the UE 402 and in some cases at the gNB 416. A BWP containing a larger number of PRBs can be used for scenarios with higher traffic load.

The RAN 404 is communicatively coupled to CN 420 that includes network elements to provide various functions to support data and telecommunications services to customers/subscribers (for example, users of UE 402). The components of the CN 420 may be implemented in one physical node or separate physical nodes. In some embodiments, NFV may be utilized to virtualize any or all of the functions provided by the network elements of the CN 420 onto physical compute/storage resources in servers, switches, etc. A logical instantiation of the CN 420 may be referred to as a network slice, and a logical instantiation of a portion of the CN 420 may be referred to as a network sub-slice.

In some embodiments, the CN 420 may be an LTE CN 422, which may also be referred to as an EPC. The LTE CN 422 may include MME 424, SGW 426, SGSN 428, HSS 430, PGW 432, and PCRF 434 coupled with one another over interfaces (or "reference points") as shown. Functions of the elements of the LTE CN 422 may be briefly introduced as follows.

The MME 424 may implement mobility management functions to track a current location of the UE 402 to facilitate paging, bearer activation/deactivation, handovers, gateway selection, authentication, etc.

The SGW 426 may terminate an S1 interface toward the RAN and route data packets between the RAN and the LTE CN 422. The SGW 426 may be a local mobility anchor point for inter-RAN node handovers and also may provide an anchor for inter-3GPP mobility. Other responsibilities may include lawful intercept, charging, and some policy enforcement.

The SGSN 428 may track a location of the UE 402 and perform security functions and access control. In addition, the SGSN 428 may perform inter-EPC node signaling for mobility between different RAT networks; PDN and S-GW selection as specified by MME 424; MME selection for handovers; etc. The S3 reference point between the MME 424 and the SGSN 428 may enable user and bearer information exchange for inter-3GPP access network mobility in idle/active states.

The HSS 430 may include a database for network users, including subscription-related information to support the network entities' handling of communication sessions. The HSS 430 can provide support for routing/roaming, authentication, authorization, naming/addressing resolution, location dependencies, etc. An S6a reference point between the HSS 430 and the MME 424 may enable transfer of subscription and authentication data for authenticating/authorizing user access to the LTE CN 420.

The PGW 432 may terminate an SGi interface toward a data network (DN) 436 that may include an application/content server 438. The PGW 432 may route data packets between the LTE CN 422 and the data network 436. The PGW 432 may be coupled with the SGW 426 by an S5 reference point to facilitate user plane tunneling and tunnel management. The PGW 432 may further include a node for policy enforcement and charging data collection (for example, PCEF). Additionally, the SGi reference point between the PGW 432 and the data network 436 may be an operator external public, a private PDN, or an intra-operator packet data network, for example, for provision of IMS services. The PGW 432 may be coupled with a PCRF 434 via a Gx reference point.

The PCRF 434 is the policy and charging control element of the LTE CN 422. The PCRF 434 may be communicatively coupled to the app/content server 438 to determine appropriate QoS and charging parameters for service flows. The PCRF 432 may provision associated rules into a PCEF (via Gx reference point) with appropriate TFT and QCI.

In some embodiments, the CN 420 may be a 5GC 440. The 5GC 440 may include an AUSF 442, AMF 444, SMF 446, UPF 448, NSSF 450, NEF 452, NRF 454, PCF 456, UDM 458, and AF 460 coupled with one another over interfaces (or "reference points") as shown. Functions of the elements of the 5GC 440 may be briefly introduced as follows.

The AUSF 442 may store data for authentication of UE 402 and handle authentication-related functionality. The AUSF 442 may facilitate a common authentication framework for various access types. In addition to communicating with other elements of the 5GC 440 over reference points as shown, the AUSF 442 may exhibit an Nausf service-based interface.

The AMF 444 may allow other functions of the 5GC 440 to communicate with the UE 402 and the RAN 404 and to subscribe to notifications about mobility events with respect to the UE 402. The AMF 444 may be responsible for registration management (for example, for registering UE 402), connection management, reachability management, mobility management, lawful interception of AMF-related events, and access authentication and authorization. The AMF 444 may provide transport for SM messages between the UE 402 and the SMF 446, and act as a transparent proxy for routing SM messages. AMF 444 may also provide transport for SMS messages between UE 402 and an SMSF. AMF 444 may interact with the AUSF 442 and the UE 402 to perform various security anchor and context management functions. Furthermore, AMF 444 may be a termination point of a RAN CP interface, which may include or be an N2 reference point between the RAN 404 and the AMF 444; and the AMF 444 may be a termination point of NAS (N1) signaling, and perform NAS ciphering and integrity protection. AMF 444 may also support NAS signaling with the UE 402 over an N3 IWF interface.

The SMF 446 may be responsible for SM (for example, session establishment, tunnel management between UPF 448 and AN 408); UE IP address allocation and management (including optional authorization); selection and control of UP function; configuring traffic steering at UPF 448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 444 over N2 to AN 408; and determining SSC mode of a session. SM may refer to management of a PDU session, and a PDU session or "session" may refer to a PDU connectivity service that provides or enables the exchange of PDUs between the UE 402 and the data network 436.

The UPF 448 may act as an anchor point for intra-RAT and inter-RAT mobility, an external PDU session point of interconnect to data network 436, and a branching point to support multi-homed PDU session. The UPF 448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 448 may include an uplink classifier to support routing traffic flows to a data network.

The NSSF 450 may select a set of network slice instances serving the UE 402. The NSSF 450 may also determine allowed NSSAI and the mapping to the subscribed S-NSSAIs, if needed. The NSSF 450 may also determine the AMF set to be used to serve the UE 402, or a list of candidate AMFs based on a suitable configuration and possibly by querying the NRF 454. The selection of a set of network slice instances for the UE 402 may be triggered by the AMF 444 with which the UE 402 is registered by interacting with the NSSF 450, which may lead to a change of AMF. The NSSF 450 may interact with the AMF 444 via an N22 reference point; and may communicate with another NSSF in a visited network via an N31 reference point (not shown). Additionally, the NSSF 450 may exhibit an Nnssf service-based interface.

The NEF 452 may securely expose services and capabilities provided by 3GPP network functions for third party, internal exposure/re-exposure, AFs (e.g., AF 460), edge computing or fog computing systems, etc. In such embodiments, the NEF 452 may authenticate, authorize, or throttle the AFs. NEF 452 may also translate information exchanged with the AF 460 and information exchanged with internal network functions. For example, the NEF 452 may translate between an AF-Service-Identifier and an internal 5GC information. NEF 452 may also receive information from other NFs based on exposed capabilities of other NFs. This information may be stored at the NEF 452 as structured data, or at a data storage NF using standardized interfaces. The stored information can then be re-exposed by the NEF 452 to other NFs and AFs, or used for other purposes such as analytics. Additionally, the NEF 452 may exhibit an Nnef service-based interface.

The NRF 454 may support service discovery functions, receive NF discovery requests from NF instances, and provide the information of the discovered NF instances to the NF instances. NRF 454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 454 may exhibit the Nnrf service-based interface.

The PCF 456 may provide policy rules to control plane functions to enforce them, and may also support unified policy framework to govern network behavior. The PCF 456 may also implement a front end to access subscription information relevant for policy decisions in a UDR of the UDM 458. In addition to communicating with functions over reference points as shown, the PCF 456 exhibit an Npcf service-based interface.

The UDM 458 may handle subscription-related information to support the network entities' handling of communication sessions, and may store subscription data of UE 402. For example, subscription data may be communicated via an N8 reference point between the UDM 458 and the AMF 444. The UDM 458 may include two parts, an application front end and a UDR.

The UDR may store subscription data and policy data for the UDM 458 and the PCF 456, and/or structured data for exposure and application data (including PFDs for application detection, application request information for multiple UEs 402) for the NEF 452. The Nudr service-based interface may be exhibited by the UDR 221 to allow the UDM 458, PCF 456, and NEF 452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 458 may exhibit the Nudm service-based interface.

The AF 460 may provide application influence on traffic routing, provide access to NEF, and interact with the policy framework for policy control.

In some embodiments, the 5GC 440 may enable edge computing by selecting operator/3$^{rd}$ party services to be geographically close to a point that the UE 402 is attached to the network. This may reduce latency and load on the network. To provide edge-computing implementations, the 5GC 440 may select a UPF 448 close to the UE 402 and execute traffic steering from the UPF 448 to data network 436 via the N6 interface. This may be based on the UE subscription data, UE location, and information provided by the AF 460. In this way, the AF 460 may influence UPF (re)selection and traffic routing. Based on operator deployment, when AF 460 is considered to be a trusted entity, the network operator may permit AF 460 to interact directly with relevant NFs. Additionally, the AF 460 may exhibit an Naf service-based interface.

The data network 436 may represent various network operator services, Internet access, or third party services that may be provided by one or more servers including, for example, application/content server 438.

FIG. 5 schematically illustrates a wireless network 500 in accordance with various embodiments. The wireless network 500 may include a UE 502 in wireless communication with an AN 504. The UE 502 and AN 504 may be similar to, and substantially interchangeable with, like-named components described elsewhere herein.

The UE 502 may be communicatively coupled with the AN 504 via connection 506. The connection 506 is illustrated as an air interface to enable communicative coupling, and can be consistent with cellular communications protocols such as an LTE protocol or a 5G NR protocol operating at mmWave or sub-6 GHz frequencies.

The UE 502 may include a host platform 508 coupled with a modem platform 510. The host platform 508 may include application processing circuitry 512, which may be coupled with protocol processing circuitry 514 of the modem platform 510. The application processing circuitry 512 may run various applications for the UE 502 that source/sink application data. The application processing circuitry 512 may further implement one or more layer operations to transmit/receive application data to/from a data network. These layer operations may include transport (for example UDP) and Internet (for example, IP) operations.

The protocol processing circuitry 514 may implement one or more of layer operations to facilitate transmission or reception of data over the connection 506. The layer operations implemented by the protocol processing circuitry 514 may include, for example, MAC, RLC, PDCP, RRC and NAS operations.

The modem platform 510 may further include digital baseband circuitry 516 that may implement one or more layer operations that are "below" layer operations performed by the protocol processing circuitry 514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 510 may further include transmit circuitry 518, receive circuitry 520, RF circuitry 522, and RF front end (RFFE) 524, which may include or connect to one or more antenna panels 526. Briefly, the transmit circuitry 518 may include a digital-to-analog converter, mixer, intermediate frequency (IF) components, etc.; the receive circuitry 520 may include an analog-to-digital converter, mixer, IF components, etc.; the RF circuitry 522 may include a low-noise amplifier, a power amplifier, power tracking components, etc.; RFFE 524 may include filters (for example, surface/bulk acoustic wave filters), switches, antenna tuners, beamforming components (for example, phase-array antenna components), etc. The selection and arrangement of the components of the transmit circuitry 518, receive circuitry 520, RF circuitry 522, RFFE 524, and antenna panels 526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 514 may include one or more instances of control circuitry (not shown) to provide control functions for the transmit/receive components.

A UE reception may be established by and via the antenna panels 526, RFFE 524, RF circuitry 522, receive circuitry 520, digital baseband circuitry 516, and protocol processing circuitry 514. In some embodiments, the antenna panels 526 may receive a transmission from the AN 504 by receive-beamforming signals received by a plurality of antennas/antenna elements of the one or more antenna panels 526.

A UE transmission may be established by and via the protocol processing circuitry 514, digital baseband circuitry 516, transmit circuitry 518, RF circuitry 522, RFFE 524, and antenna panels 526. In some embodiments, the transmit components of the UE 504 may apply a spatial filter to the data to be transmitted to form a transmit beam emitted by the antenna elements of the antenna panels 526.

Similar to the UE 502, the AN 504 may include a host platform 528 coupled with a modem platform 530. The host platform 528 may include application processing circuitry 532 coupled with protocol processing circuitry 534 of the modem platform 530. The modem platform may further include digital baseband circuitry 536, transmit circuitry 538, receive circuitry 540, RF circuitry 542, RFFE circuitry 544, and antenna panels 546. The components of the AN 504 may be similar to and substantially interchangeable with like-named components of the UE 502. In addition to performing data transmission/reception as described above, the components of the AN 508 may perform various logical functions that include, for example, RNC functions such as radio bearer management, uplink and downlink dynamic radio resource management, and data packet scheduling.

Figure 6:
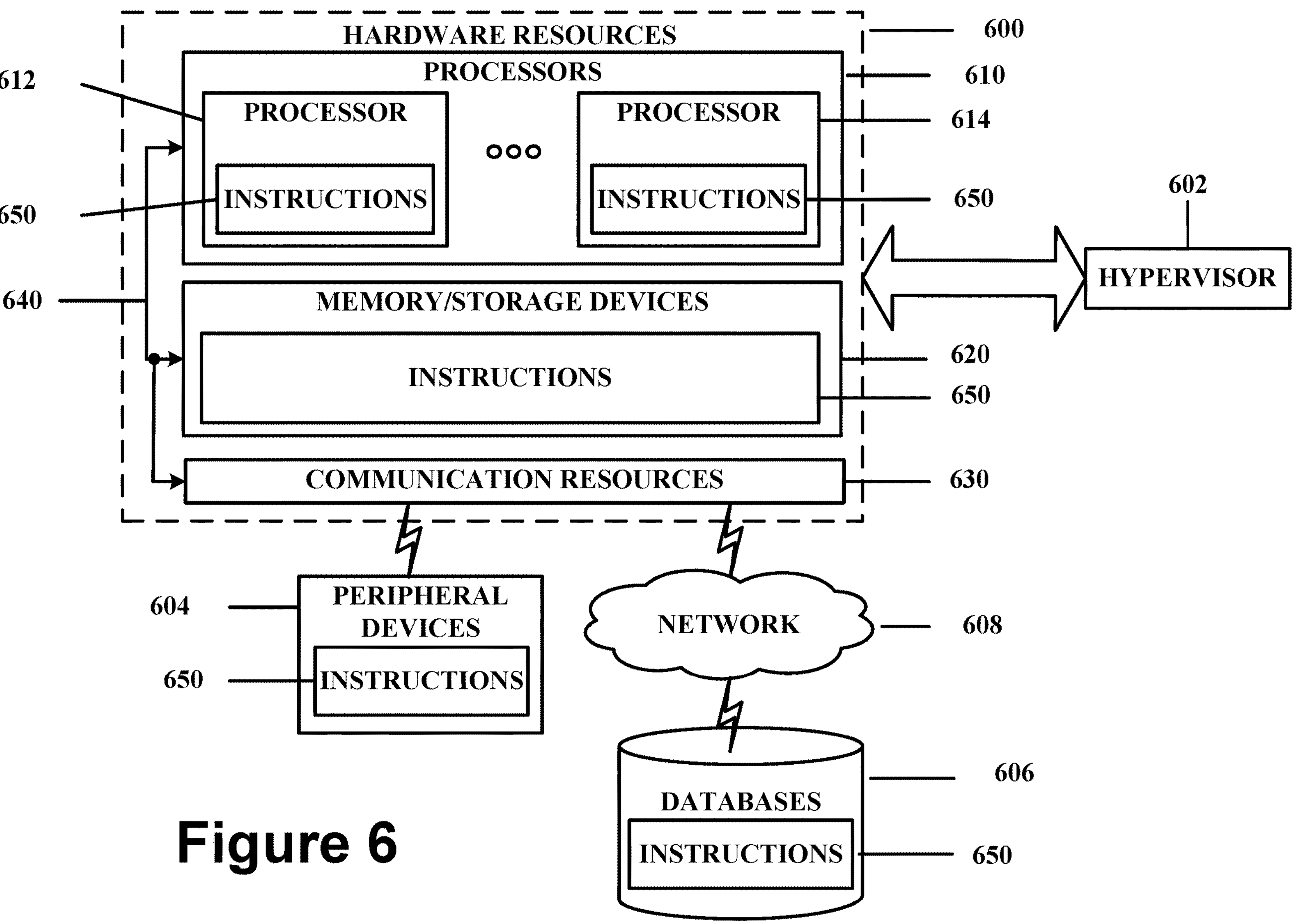
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640 or other interface circuitry. For embodiments where node virtualization (e.g., NFV) is utilized, a hypervisor 602 may be executed to provide an execution environment for one or more network slices/sub-slices to utilize the hardware resources 600.

The processors 610 may include, for example, a processor 612 and a processor 614. The processors 610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 620 may include main memory, disk storage, or any suitable combination thereof. The memory/storage devices 620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 630 may include interconnection or network interface controllers, components, or other suitable devices to communicate with one or more peripheral devices 604 or one or more databases 606 or other network elements via a network 608. For example, the communication resources 630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a system and/or method of transmitting a channel state information (CSI) report for enhanced ultra-reliable low-latency communication (URLLC) comprising:

receiving, by a UE, of a CSI reporting configuration from a gNB, receiving, by a UE, of a CSI report request from a gNB, measuring, by a UE, of one or multiple CSI with wideband and sub-band CQI, and reporting, by a UE, of one or multiple CSI reports on PUCCH or PUSCH.

Example 2 may include the method of example 1 or some other example herein, wherein a UE may be configured with an alternative sub-band CQI signaling mechanism wherein the sub-band CQI is signaled by an X-bit payload, with X being a value from 2, 3, 4, 5, and the actual sub-band CQI may be calculated from a wideband CQI and the X-bit payload.

Example 3 may include the method of example 2 or some other example herein, wherein the X-bit sub-band CQI may be interpreted as an offset from the reported wideband CQI, with at least one or two codepoints of the X-bit range denoting one or both of: very low SINR (outage SINR) and very high SINR.

Example 4 may include the method of example 3 or some other example herein, wherein the "very high SINR" can be interpreted as the channel quality that may correspond to a spectral efficiency value (SE) greater than SE of the CQI=15 by at least Y bit/sec/Hz, where Y may be for example 0.5, 1, 1.5 or any other positive value. Y may be pre-defined in specification or may be configurable by the network to the UE as part of CSI measurement and reporting framework.

Example 5 may include the method of example 3 or some other example herein, wherein the "very low SINR" can be interpreted as the channel quality that may correspond to a SE value smaller than SE of CQI=1 by at least Z bit/sec/Hz, where Z may be for example 0.5, 1, 1.5 or any other positive value. Z may be pre-defined in specification or may be configurable by the network to the UE as part of CSI measurement and reporting framework.

Example 6 may include the method of example 2 or some other example herein, wherein the "out of range" CQI value=0 may be associated with a more precise meaning of the "out of range". The UE may be configured to interpret CQI=0 to be associated with at least Z bit/sec/Hz smaller SE value than the CQI value=1 in the configured table.

Example 7 may include the method of example 2 or some other example herein, wherein for X-bit differential sub-band CQI reporting, the UE may be configured how to use the 2^X levels of the differential signaling with respect to WB CQI, e.g., where in the scale to place the WB_CQI.

Example 8 may include the method of example 7 or some other example herein, wherein a UE may be configured/instructed to always report an X-bit difference to WB CQI with A levels above the WB CQI and (2^X−A) levels equal to or below the WB CQI and may apply special handling when |WB CQI+SB diff CQI| is <1 or >15, e.g., how to handle the resulting value over the legacy range of 0 . . . 15.

Example 9 may include the method of example 7 or some other example herein, wherein if WB_CQI−SB_CQI_difference| exceeds the range 0 . . . 15, a specific handling may be applied. For example, it may be defined that every step down or up from the bound of the effective SINR range defined by CQI=1 and CQI=15 may be interpreted as B dB offset from the SINR corresponding to CQI=1 or CQI=15, wherein the B dB offset may be pre-defined in specification (e.g. to 1,1.5, 2, 2.5, 3 dB etc.) or may be configurable as part of CSI reporting and measurements configuration.

Example 10 may include the method of example 2 or some other example herein, wherein if 4-bit SB CQI reporting is employed, then the meaning of WB_CQI may be changed, since the regular WB_CQI can be derived directly from separate SB_CQIs. For example, the WB_CQI may be interpreted as an offset (in terms of SE or SINR) to SB_CQI reports, that can provide additional information beyond the SINR range of a single CQI table.

Example 11 may include the method of example 2 or some other example herein, wherein assuming that sub-band CQI is reported for all sub-bands, a UE may be indicated to use extended bit-field of X=3 or 4 bits for reporting of differential sub-band CQI for the worst-M sub-bands or for the best-N sub-bands or for both, where the values of M and N may be specified (e.g., as a fixed value or as a function of the total number of sub-bands) or configured to the UE via dedicated higher layer signaling.

Example 12 may include the method of example 1 or some other example herein, wherein a UE may be configured/instructed to report WB_CQI using a first CQI table and first BLER target, and SB_CQI with X-bit differential or absolute signaling using a second CQI table BLER target.

Example 13 may include the method of example 1 or some other example herein, wherein a UE may be configured/instructed to report WB_CQI and SB_CQI for a first table for a first BLER target, and WB_CQI and X-bit differential or absolute SB_CQI for a second table for a second BLER target.

Example 14 may include the method of example 1 or some other example herein, wherein a UE may be configured/instructed to report absolute SB_CQIs for a first table for a first BLER target, and a WB_CQI which is interpreted as an offset to SINR or SE associated with the SB_CQIs of the first table to obtain SB_CQIs associated with the second table for a second BLER target.

Example 15 may include the method of example 1 or some other example herein, wherein a UE may be configured with multiple CQI tables and a single BLER target per CSI report configuration, and the table the CQI is signaled for, may be selected by UE implementation and indicated in the CSI report together with the CQI values.

Example 16 may include the method of example 1 or some other example herein, wherein when all sub-bands are configured with 4-bit CQI reporting, the WB CQI may be re-interpreted so that SB CQI is calculated as the 4-bit SB CQI value plus CQI offset signaled in WB CQI taking range from [−8 . . . +7], or other range [X . . . X+15], where X may be configured or predefined from −15 to 15.

Example 17 may include the method of example 16 or some other example herein, wherein when resulting SB CQI is <1 or >15, the corresponding SE is scaled. For example, for CQI=0, the SE may be derived from CQI=1 by scaling 2 times, or assuming 2 repetitions of the same TB associated with CQI=1. For CQI=−1, the scaling may be 3 times, or assuming 3 repetitions of the same TB, and so on. Moreover, the modulation, SE, code rate and number of repetitions corresponding to a given CQI value<1 and >15 may be configured by RRC.

Example 18 may include the method of example 1 or some other example herein, wherein when all sub-bands are configured with 4-bit CQI reporting, the WB CQI may be re-interpreted as the minimum effective SINR among indicated sub-bands including values below the SINR corresponding to CQI=1. A mapping table between effective SINR/SE for CQI<1 and the value signaled in WB CQI may be configured by RRC or predefined in specification.

Example 19 may include a method of a UE, the method comprising:

receiving configuration information for CSI reporting;

receiving a request for a CSI report;

obtaining, based on the configuration information and the request, one or more CSI with wideband and sub-band CQI; and reporting the one or more CSI with wideband and sub-band CQI.

Example 20 may include the method of example 19 or some other example herein, wherein the one or more CSI are reported in a PUCCH or a PUSCH.

Example 21 may include the method of example 19-20 or some other example herein, wherein the request includes a payload to indicate the sub-band CQI.

Example 22 may include the method of example 21 or some other example herein, wherein the sub-band CQI is indicated by the payload and the wideband CQI.

Example 23 may include the method of example 21-22 or some other example herein, wherein the payload is 2 to 5 bits.

Example 24 may include the method of example 19-23 or some other example herein, wherein the report is for enhanced ultra-reliable low-latency communication (URLLC).

Example 25 may include a method to be performed by a user equipment (UE), wherein the method comprises:

identifying channel state information (CSI) for a wideband and one or more sub-bands of the wideband, wherein the CSI is related to a signal to interference and noise ratio (SINR) of the wideband and respective SINRs of the one or more sub-bands;

transmitting a wideband channel quality index (CQI) report related to the CSI of the wideband;

identifying, from the set of 2, 3, 4, and 5, a number of bits to use for a sub-band CQI report related to a sub-band of the one or more sub-bands; and transmitting a sub-band CQI report based on the identified number of bits, wherein the sub-band CQI report is related to the CSI of the sub-band.

Example 26 may include the method of example 25, and/or some other example herein, wherein the identified number of bits is based on an indication received from a base station.

Example 27 may include the method of any of examples 25-26, and/or some other example herein, wherein the sub-band CQI report indicates that the sub-band has a spectral efficiency (SE) value that is greater than the SE of a highest possible value that can be signaled by a 4-bit CQI table.

Example 28 may include the method of example 27, and/or some other example herein, wherein the CQI report indicates that the sub-band has a SE value that is greater than the SE of the highest possible value that can be indicated by a 4-bit CQI table by at least Y bits/second/Hertz (Hz), where Y is pre-defined or provided to the UE via higher layer signalling.

Example 29 may include the method of any of examples 25-26, and/or some other example herein, wherein the sub-band CQI report indicates that the sub-band has a spectral efficiency (SE) value that is smaller than the SE of a lowest possible valid CQI value that can be signaled by a 4-bit CQI table.

Example 30 may include the method of example 29, and/or some other example herein, wherein the sub-band CQI report indicates that the sub-band has a SE value that is smaller than the SE of the smallest possible valid CQI value that can be indicated by a 4-bit CQI table by at least Z bits/second/hertz (Hz), where Z is pre-defined or is provided to the UE via higher layer signalling.

Example 31 may include the method of any of examples 25-26, and/or some other example herein, wherein the sub-band CQI report indicates a measured CQI of 0 that corresponds to a spectral efficiency (SE) value of at least Z bits/second/Hertz (Hz) smaller than the CQI value=1.

Example 32 may include the method of any of examples 25-26, and/or some other example herein, wherein the sub-band CQI report includes 2^(identified number of bits) levels with respect to the wideband CQI report, and wherein the UE is further configured with A levels above a reported wideband CQI value and (2^(identified number of bits)−A) levels below the reported wideband CQI value.

Example 33 may include the method of example 32, and/or some other example herein, wherein the value of A is specified as a function of the identified number of bits for the sub-band CQI report.

Example 34 may include the method of example 32, and/or some other example herein, wherein the value of A is a function of the identified number of bits of the sub-band CQI report and the reported wideband CQI value.

Example 35 may include the method of any of examples 25-26, and/or some other example herein, wherein all sub-bands are configured with 4-bit CQI reporting and a sub-band CQI value is determined as a sum of the value reported by the UE in the sub-band CQI report and a value reported by the UE in the wideband CQI report that is interpreted as an offset with a range of [−8 . . . +7] or [X . . . X+15], where the value of X is provided to the UE by higher layers from the integers {−15, . . . , 15}.

Example 36 may include the method of example 35, and/or some other example herein, wherein, if the sub-band CQI value is less than 1 or greater than 15, a corresponding spectral efficiency (SE) is scaled.

Example 37 may include a method to be performed by a base station, wherein the method comprises:

identifying, from a user equipment (UE), a wideband channel quality index (CQI) report related to the wideband;

processing the wideband CQI report to identify channel state information (CSI) of the wideband, wherein the CSI of the wideband is related to a signal to interference and noise ratio (SINR) of the wideband;

identifying, from the UE, a sub-band CQI report related to a sub-band of one or more sub-bands, wherein the sub-band CQI report is transmitted using 5 bits; and processing the sub-band CQI report to identify CSI of the sub-band, wherein the CSI of the sub-band is related to a SINR of the sub-band.

Example 38 may include the method of example 37, and/or some other example herein, further comprising transmitting, to the UE, an indication that the sub-band CQI report is to be transmitted using a 5-bit CQI table.

Example 39 may include the method of any of example 37-38, and/or some other example herein, wherein the sub-band CQI report indicates that the sub-band has a spectral efficiency (SE) value that is greater than the SE of a highest possible value that can be signaled by a 4-bit CQI table.

Example 40 may include the method of example 39, wherein the CQI report indicates that the sub-band has a SE value that is greater than the SE of the highest possible value that can be indicated by a 4-bit CQI table by at least Y bits/second/Hertz (Hz), where Y is pre-defined or provided to the UE via higher layer signalling.

Example 41 may include the method of any of example 37-38, and/or some other example herein, wherein the sub-band CQI report indicates that the sub-band has a spectral efficiency (SE) value that is smaller than the SE of a lowest possible valid CQI value that can be signaled by a 4-bit CQI table.

Example 42 may include the method of example 41, and/or some other example herein, wherein the sub-band CQI report indicates that the sub-band has a SE value that is smaller than the SE of the smallest possible valid CQI value that can be indicated by a 4-bit CQI table by at least Z bits/second/hertz (Hz), where Z is pre-defined or is provided to the UE via higher layer signalling.

Example 43 may include the method of any of examples 37-38, and/or some other example herein, wherein the sub-band CQI report indicates a measured CQI of 0 that corresponds to a spectral efficiency (SE) value of at least Z bits/second/Hertz (Hz) smaller than the CQI value=1.

Example 44 may include the method of any of examples 37-38, and/or some other example herein, wherein the sub-band CQI report includes 2^(number of bits used to transmit the sub-band CQI report) levels with respect to the wideband CQI report, and wherein the UE is further configured with A levels above a reported wideband CQI value and (2^(number of bits used to transmit the sub-band CQI report)−A) levels below the reported wideband CQI value.

Example 45 may include the method of example 44, and/or some other example herein, wherein the value of A is specified as a function of the identified number of bits for the sub-band CQI report.

Example 46 may include the method of example 44, and/or some other example herein, wherein the value of A is a function of a number of bits used to transmit the sub-band CQI report and the reported wideband CQI value.

Example Z01 may include an apparatus comprising means to perform one or more elements of a method described in or related to any of examples 1-46, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-46, or any other method or process described herein.

Example Z03 may include an apparatus comprising logic, modules, or circuitry to perform one or more elements of a method described in or related to any of examples 1-46, or any other method or process described herein.

Example Z04 may include a method, technique, or process as described in or related to any of examples 1-46, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-46, or portions thereof.

Example Z06 may include a signal as described in or related to any of examples 1-46, or portions or parts thereof.

Example Z07 may include a datagram, packet, frame, segment, protocol data unit (PDU), or message as described in or related to any of examples 1-46, or portions or parts thereof, or otherwise described in the present disclosure.

Example Z08 may include a signal encoded with data as described in or related to any of examples 1-46, or portions or parts thereof, or otherwise described in the present disclosure.

Example Z09 may include a signal encoded with a datagram, packet, frame, segment, protocol data unit (PDU), or message as described in or related to any of examples 1-46, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-46, or portions thereof.

Example Z11 may include a computer program comprising instructions, wherein execution of the program by a processing element is to cause the processing element to carry out the method, techniques, or process as described in or related to any of examples 1-46, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |

-continued

| | |
|---|---|
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |

| | |
|---|---|
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |

| | |
|---|---|
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |

-continued

| | |
|---|---|
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |

-continued

| | |
|---|---|
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |

-continued

| | |
|---|---|
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |

-continued

| | |
|---|---|
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | SS/PBCH Block Resource Indicator, Synchronization |
| Block SSBRI | Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |

-continued

| | |
|---|---|
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. A user equipment (UE) comprising:
memory to store identified channel state information (CSI) for a wideband and one or more sub-bands of the wideband, wherein the CSI is related to a signal to interference and noise ratio (SINR) of the wideband and respective SINRs of the one or more sub-bands; and
one or more processors configured to:
facilitate transmission of a wideband channel quality index (CQI) report related to the CSI of the wideband;
identify, from the set of 2, 3, 4, and 5, a number of bits to use for a sub-band CQI report related to a sub-band of the one or more sub-bands; and
facilitate transmission of a sub-band CQI report based on the identified number of bits, wherein the sub-band CQI report is related to the CSI of the sub-band, and wherein the identified number of bits is configured to provide an extended SINR reporting range for the sub-band relative to the wideband CQI report.

2. The UE of claim 1, wherein the identified number of bits is based on an indication received from a base station provide the extended SINR reporting range.

3. The UE of claim 1, wherein the sub-band CQI report indicates that the sub-band has a spectral efficiency (SE) value that is greater than the SE of a highest possible value that can be signaled by a 4-bit CQI table.

4. The UE of claim 3, wherein the sub-band CQI report indicates that the sub-band has a SE value that is greater than the SE of the highest possible value that can be indicated by a 4-bit CQI table by at least Y bits/second/Hertz (Hz), where Y is pre-defined or provided to the UE via higher layer signalling.

5. The UE of claim 1, wherein the sub-band CQI report indicates that the sub-band has a spectral efficiency (SE) value that is smaller than the SE of a lowest possible valid CQI value that can be signaled by a 4-bit CQI table.

6. The UE of claim 5, wherein the sub-band CQI report indicates that the sub-band has a SE value that is smaller than the SE of the smallest possible valid CQI value that can be indicated by a 4-bit CQI table by at least Z bits/second/hertz (Hz), where Z is pre-defined or is provided to the UE via higher layer signalling.

7. The UE of claim 1, wherein the sub-band CQI report indicates a measured CQI of 0 that corresponds to a spectral efficiency (SE) value of at least Z bits/second/Hertz (Hz) smaller than the CQI value=1.

8. The UE of claim 1, wherein the sub-band CQI report includes 2^(identified number of bits) levels with respect to the wideband CQI report, and wherein the UE is further configured with A levels above a reported wideband CQI value and (2^(identified number of bits)−A) levels below the reported wideband CQI value.

9. The UE of claim 8, wherein the value of A is specified as a function of the identified number of bits for the sub-band CQI report.

10. The UE of claim 8, wherein the value of A is a function of the identified number of bits of the sub-band CQI report and the reported wideband CQI value.

11. The UE of claim 1, wherein all sub-bands are configured with 4-bit CQI reporting and a sub-band CQI value is determined as a sum of the value reported by the UE in the sub-band CQI report and a value reported by the UE in the wideband CQI report that is interpreted as an offset with a range of [−8 . . . +7] or [X . . . X+15], where the value of X is provided to the UE by higher layers from the integers {−15, . . . , 15}.

12. The UE of claim 11, wherein, if the sub-band CQI value is less than 1 or greater than 15, a corresponding spectral efficiency (SE) is scaled.

13. A base station comprising:

one or more processors; and one or more computer-readable media comprising instructions that, upon execution of the instructions by the one or more processors, are to cause the base station to:

identify, from a user equipment (UE), a wideband channel quality index (CQI) report related to the wideband;

process the wideband CQI report to identify channel state information (CSI) of the wideband, wherein the CSI of the wideband is related to a signal to interference and noise ratio (SINR) of the wideband;

identify, from the UE, a sub-band CQI report related to a sub-band of one or more sub-bands, wherein the sub-band CQI report is transmitted using a number of bits identified from the set of 2, 3, 4, and; and process the sub-band CQI report to identify CSI of the sub-band, wherein the CSI of the sub-band is related to a SINR of the sub-band, and wherein the number of bits is configured to provide an extended SINR reporting range for the sub-band relative to the wideband CQI report.

14. The base station of claim 13, wherein the instructions are further to transmit, to the UE, an indication of the number of bits to use for the sub-band CQI report to provide the extended SINR reporting range.

15. The base station of claim 13, wherein the sub-band CQI report indicates that the sub-band has a spectral efficiency (SE) value that is greater than the SE of a highest possible value that can be signaled by a 4-bit CQI table.

16. The base station of claim 15, wherein the sub-band CQI report indicates that the sub-band has a SE value that is greater than the SE of the highest possible value that can be indicated by a 4-bit CQI table by at least Y bits/second/Hertz (Hz), where Y is pre-defined or provided to the UE via higher layer signalling.

17. The base station of claim 13, wherein the sub-band CQI report indicates that the sub-band has a spectral efficiency (SE) value that is smaller than the SE of a lowest possible valid CQI value that can be signaled by a 4-bit CQI table.

18. The base station of claim 17, wherein the sub-band CQI report indicates that the sub-band has a SE value that is smaller than the SE of the smallest possible valid CQI value that can be indicated by a 4-bit CQI table by at least Z bits/second/hertz (Hz), where Z is pre-defined or is provided to the UE via higher layer signalling.

19. The base station of claim 13, wherein the sub-band CQI report indicates a measured CQI of 0 that corresponds to a spectral efficiency (SE) value of at least Z bits/second/Hertz (Hz) smaller than the CQI value=1.

20. The base station of claim 13, wherein the sub-band CQI report includes 2^(number of bits used to transmit the sub-band CQI report) levels with respect to the wideband CQI report, and wherein the UE is further configured with A levels above a reported wideband CQI value and (2^(number of bits used to transmit the sub-band CQI report)−A) levels below the reported wideband CQI value.

* * * * *